(12) United States Patent
Powell et al.

(10) Patent No.: US 8,868,533 B2
(45) Date of Patent: Oct. 21, 2014

(54) METHOD AND APPARATUS FOR INTELLIGENT CAPTURE OF DOCUMENT OBJECT MODEL EVENTS

(75) Inventors: Travis Spence Powell, San Francisco, CA (US); Nadav Caspi, San Francisco, CA (US); Ashwin Singhania, San Francisco, CA (US); Robert I. Wenig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 13/419,179

(22) Filed: Mar. 13, 2012

(65) Prior Publication Data

US 2012/0173966 A1 Jul. 5, 2012

Related U.S. Application Data

(63) Continuation-in-part of application No. 12/904,356, filed on Oct. 14, 2010, now Pat. No. 8,583,772, and a continuation-in-part of application No. 12/191,585, filed on Mar. 13, 2012, and a continuation-in-part of application No. 13/337,905, filed on Dec. 27, 2011, now Pat. No. 8,335,848, which is a continuation of application No. 11/616,616, filed on Dec. 27, 2006, now Pat. No. 8,127,000.

(60) Provisional application No. 61/332,498, filed on May 7, 2010, provisional application No. 60/806,443, filed on Jun. 30, 2006.

(51) Int. Cl.
*G06F 7/00* (2006.01)
*H04L 29/08* (2006.01)
*G06Q 30/02* (2012.01)
*H04L 12/26* (2006.01)
*H04L 12/24* (2006.01)

(52) U.S. Cl.
CPC .......... *G06Q 30/0241* (2013.01); *H04L 43/028* (2013.01); *H04L 67/142* (2013.01); *H04L 67/02* (2013.01); *H04L 12/24* (2013.01); *H04L 41/00* (2013.01)
USPC ....................................................... 707/705

(58) Field of Classification Search
CPC ............................................. G06B 2219/31215
See application file for complete search history.

(56) References Cited

U.S. PATENT DOCUMENTS 5,463,547 A 10/1995 Markowitz
5,564,043 A 10/1996 Siefert
(Continued)

FOREIGN PATENT DOCUMENTS

CA 2656539 2/2008
CA 2696884 3/2009
(Continued)

OTHER PUBLICATIONS

Han et al., "Using Ajax for Desktop-dike Geospatial Web Application Development," Geoinformatics, 2009 17th International Conference on Aug. 12-14, 2009, <http://geobrain.laits.gmu.edu/geobrainhome/docs/GeOnAS_Ajax.pdf>.

(Continued)

*Primary Examiner* — Alan Chen
(74) *Attorney, Agent, or Firm* — Stolowitz Ford Cowger LLP

(57) ABSTRACT

A monitoring system intelligently captures Document Object Model (DOM) events. The DOM events may provide state information that may not usually be captured during a web session. To reduce processing bandwidth, content identifiers may be used to represent some DOM events. Checkpoints may be identified during the web session and a current state of the webpage may be captured to provide replay synchronization. Different data may be captured based on a sequence and timing of the DOM events during the original web session. Data exchanged with third party websites also may be selectively captured to provide a more through simulation of the original web session.

20 Claims, 12 Drawing Sheets

(56) References Cited

U.S. PATENT DOCUMENTS

| | | |
|---|---|---|
| 5,577,254 A | 11/1996 | Gilbert |
| 5,699,526 A | 12/1997 | Siefert |
| 5,715,314 A | 2/1998 | Payne |
| 5,717,879 A | 2/1998 | Moran et al. |
| 5,721,906 A | 2/1998 | Siefert |
| 5,751,962 A | 5/1998 | Fanshier et al. |
| 5,774,552 A | 6/1998 | Grimmer |
| 5,781,735 A | 7/1998 | Southard |
| 5,809,250 A | 9/1998 | Kisor |
| 5,825,880 A | 10/1998 | Sudia |
| 5,832,458 A | 11/1998 | Jones |
| 5,832,496 A | 11/1998 | Anand et al. |
| 5,845,124 A | 12/1998 | Berman |
| 5,848,396 A | 12/1998 | Gerace |
| 5,848,412 A | 12/1998 | Rowland |
| 5,857,188 A | 1/1999 | Douglas |
| 5,867,578 A | 2/1999 | Brickell |
| 5,870,559 A | 2/1999 | Leshem et al. |
| 5,894,516 A | 4/1999 | Brandenburg |
| 5,903,652 A | 5/1999 | Mital |
| 5,905,868 A | 5/1999 | Baghai et al. |
| 5,909,492 A | 6/1999 | Payne |
| 5,930,786 A | 7/1999 | Carino, Jr. et al. |
| 5,933,601 A | 8/1999 | Fanshier et al. |
| 5,941,957 A | 8/1999 | Ingrassia, Jr. et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,991,791 A | 11/1999 | Siefert |
| 6,006,228 A | 12/1999 | McCollum et al. |
| 6,026,403 A | 2/2000 | Siefert |
| 6,035,332 A | 3/2000 | Ingrassia, Jr. et al. |
| 6,085,223 A | 7/2000 | Carino, Jr. et al. |
| 6,151,584 A | 11/2000 | Papierniak et al. |
| 6,151,601 A | 11/2000 | Papierniak et al. |
| 6,169,997 B1 | 1/2001 | Papierniak et al. |
| 6,182,097 B1 | 1/2001 | Hansen et al. |
| 6,253,203 B1 | 6/2001 | O'Flaherty et al. |
| 6,286,030 B1 | 9/2001 | Wenig |
| 6,286,046 B1 | 9/2001 | Bryant |
| 6,286,098 B1 | 9/2001 | Wenig |
| 6,295,550 B1 | 9/2001 | Choung et al. |
| 6,317,794 B1 | 11/2001 | Papierniak et al. |
| 6,334,110 B1 | 12/2001 | Walter et al. |
| 6,397,256 B1 | 5/2002 | Chan |
| 6,418,439 B1 | 7/2002 | Papierniak et al. |
| 6,480,855 B1 | 11/2002 | Siefert |
| 6,489,980 B1 | 12/2002 | Scott et al. |
| 6,502,096 B1 | 12/2002 | Siefert |
| 6,519,600 B1 | 2/2003 | Siefert |
| 6,651,072 B1 | 11/2003 | Carino, Jr. et al. |
| 6,658,453 B1 | 12/2003 | Dattatri |
| 6,671,687 B1 | 12/2003 | Pederson et al. |
| 6,714,931 B1 | 3/2004 | Papierniak et al. |
| 6,766,333 B1 | 7/2004 | Wu et al. |
| 6,850,975 B1 | 2/2005 | Daneels et al. |
| 6,877,007 B1 | 4/2005 | Hentzel et al. |
| 7,076,495 B2 | 7/2006 | Dutta et al. |
| 7,260,837 B2 | 8/2007 | Abraham et al. |
| 7,272,639 B1 | 9/2007 | Levergood |
| 7,278,105 B1 | 10/2007 | Kitts |
| 7,293,281 B1 | 11/2007 | Moran et al. |
| 7,490,319 B2 | 2/2009 | Blackwell et al. |
| 7,580,996 B1 | 8/2009 | Allan |
| RE41,903 E | 10/2010 | Wenig |
| 8,042,055 B2 | 10/2011 | Wenig |
| 8,127,000 B2 | 2/2012 | Wenig |
| 8,219,531 B2 | 7/2012 | Eagan et al. |
| 8,335,848 B2 | 12/2012 | Wenig |
| 8,381,088 B2 | 2/2013 | Kikin-Gil et al. |
| 8,533,532 B2 | 9/2013 | Wenig |
| 8,583,772 B2 | 11/2013 | Wenig |
| 2002/0049840 A1 | 4/2002 | Squire |
| 2002/0056091 A1 | 5/2002 | Bala |
| 2002/0065912 A1 | 5/2002 | Catchpole et al. |
| 2002/0070953 A1 | 6/2002 | Barg et al. |
| 2002/0083183 A1 | 6/2002 | Pujare et al. |
| 2002/0112035 A1 | 8/2002 | Carey |
| 2002/0165954 A1 | 11/2002 | Eshghi et al. |
| 2003/0005000 A1 | 1/2003 | Landsman |
| 2003/0023715 A1 | 1/2003 | Reiner et al. |
| 2003/0128233 A1 | 7/2003 | Kasriel |
| 2003/0145071 A1 | 7/2003 | Straut |
| 2003/0154289 A1 | 8/2003 | Williamson et al. |
| 2004/0019675 A1 | 1/2004 | Hebeler |
| 2004/0059809 A1 | 3/2004 | Benedikt et al. |
| 2004/0059997 A1 | 3/2004 | Allen et al. |
| 2004/0078464 A1* | 4/2004 | Rajan et al. .................. 709/224 |
| 2004/0100507 A1 | 5/2004 | Hayner et al. |
| 2004/0158574 A1 | 8/2004 | Tom et al. |
| 2005/0021713 A1 | 1/2005 | Dugan et al. |
| 2005/0030966 A1 | 2/2005 | Cai et al. |
| 2005/0033803 A1 | 2/2005 | Vleet et al. |
| 2005/0066037 A1 | 3/2005 | Song et al. |
| 2005/0071464 A1 | 3/2005 | Kuwata et al. |
| 2005/0086606 A1 | 4/2005 | Blennerhassett et al. |
| 2005/0188080 A1 | 8/2005 | Motsinger et al. |
| 2005/0246651 A1 | 11/2005 | Krzanowski |
| 2005/0278565 A1 | 12/2005 | Frattura et al. |
| 2006/0048214 A1 | 3/2006 | Pennington et al. |
| 2006/0075088 A1 | 4/2006 | Guo |
| 2006/0117055 A1 | 6/2006 | Doyle |
| 2006/0123340 A1 | 6/2006 | Bailey et al. |
| 2006/0162071 A1 | 7/2006 | Dixon et al. |
| 2007/0106692 A1 | 5/2007 | Klein |
| 2007/0226314 A1 | 9/2007 | Eick |
| 2007/0245249 A1 | 10/2007 | Weisberg |
| 2007/0255754 A1* | 11/2007 | Gheel ........................ 707/104.1 |
| 2008/0005661 A1 | 1/2008 | Yao et al. |
| 2008/0005793 A1 | 1/2008 | Wenig et al. |
| 2008/0034036 A1 | 2/2008 | Takeshima et al. |
| 2008/0046562 A1 | 2/2008 | Butler |
| 2008/0052377 A1 | 2/2008 | Light |
| 2008/0127217 A1 | 5/2008 | Wang |
| 2008/0184129 A1 | 7/2008 | Cancel et al. |
| 2008/0216094 A1 | 9/2008 | Anderson |
| 2008/0294974 A1 | 11/2008 | Nurmi et al. |
| 2009/0013347 A1 | 1/2009 | Ahanger |
| 2009/0019133 A1 | 1/2009 | Brimley |
| 2009/0024930 A1 | 1/2009 | Kim |
| 2009/0037517 A1 | 2/2009 | Frei |
| 2009/0037914 A1 | 2/2009 | Chagoly et al. |
| 2009/0063968 A1 | 3/2009 | Wenig |
| 2009/0070869 A1 | 3/2009 | Fan et al. |
| 2009/0083714 A1 | 3/2009 | Kiciman et al. |
| 2009/0138554 A1 | 5/2009 | Longobardi et al. |
| 2009/0228474 A1 | 9/2009 | Chiu et al. |
| 2009/0247193 A1 | 10/2009 | Kalavade |
| 2009/0254529 A1 | 10/2009 | Goldentouch |
| 2010/0042573 A1 | 2/2010 | Wenig |
| 2010/0058285 A1 | 3/2010 | Meijer |
| 2010/0070929 A1 | 3/2010 | Behl et al. |
| 2010/0146380 A1 | 6/2010 | Rousso |
| 2010/0211638 A1 | 8/2010 | Rougier |
| 2010/0251128 A1 | 9/2010 | Cordasco |
| 2010/0287229 A1 | 11/2010 | Hauser |
| 2010/0318507 A1 | 12/2010 | Grant et al. |
| 2011/0029665 A1 | 2/2011 | Wenig et al. |
| 2011/0320880 A1 | 12/2011 | Wenig |
| 2012/0084437 A1 | 4/2012 | Wenig |
| 2012/0102101 A1 | 4/2012 | Wenig |
| 2012/0151329 A1 | 6/2012 | Cordasco |
| 2013/0091417 A1 | 4/2013 | Cordasco |
| 2013/0339428 A1 | 12/2013 | Wenig |
| 2014/0108911 A1 | 4/2014 | Damale |
| 2014/0115712 A1 | 4/2014 | Powell |
| 2014/0137052 A1 | 5/2014 | Hernandez |
| 2014/0143652 A1 | 5/2014 | DeLoach |

FOREIGN PATENT DOCUMENTS

| | | |
|---|---|---|
| EP | 0326283 | 8/1989 |
| EP | 0843449 | 5/1998 |
| EP | 1097428 | 6/2002 |

(56) References Cited

FOREIGN PATENT DOCUMENTS

| EP | 07840244.3 | 2/2008 |
|---|---|---|
| EP | 08769998.9 | 3/2009 |
| GB | 2357680 | 6/2008 |
| WO | 9825372 | 6/1998 |
| WO | WO 98/26571 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |

OTHER PUBLICATIONS

Lubarsky, How to Delete Cookie Using Javascript, Aug. 19, 2007, http:web.archive.org/web/20070819123555/http://blogs.x2line.com/al/articles/316.aspx.
Stolowitz Ford Cowger LLP; Listing of Related Cases; Aug. 27, 2012.
International Search Report for PCT/US12/25971; Date of mailing May 31, 2012.
Written Opinion of the International Searching Authority for PCT/US12/25971; Date of mailing May 31, 2012.
Stolowitz Ford Cowger LLP, Listing of Related Cases May 3, 2012.
Written Opinion of the International Searching Authority; PCT/US11/35410; Date of mailing Dec. 14, 2011.
International Search Report for PCT/US11/35410; Date of mailing Dec. 14, 2011.
Stolowitz Ford Cowger LLP Listing of Related Cases May 14, 2013.
Rubio, An Introduction to JSON, Feb. 28, 2007, http://www.oracle.com/technetwork/articles/entarch/introduction-json-097942.html.
Teare, An introduction to Ajax, Aug. 2005, http://www.oracle.com/technetwork/articles/entarch/ajax-introduction-096831.html.
Stolowitz Ford Cowger LLP; Listing of Related Cases; Dec. 19, 2013.
Summons to attend oral proceedings pursuant to Rule 115(1) in EP App. No. 07840244.3; Dated Dec. 12, 2013.
Smith et al., "Automated Protocol Analysis," Human Computer Interaction, 8:101-145, 1993.
Bishop, Matt et al., "A Model of Security Monitoring", Department of Mathematics and Computer Science, Dartmouth College, pp. 46-52.
Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999, pp. 337-355.
International Search Report for PCT/US08/65582; Date of Mailing Sep. 11, 2008.
International Search Report for PCT/US2007/071096; Date of mailing May 13, 2008.
Written Opinion of the international Searching Authority for PCT/US08/65582; Mailing date Sep. 11, 2008.
Written Opinion of the International Searching Authority for PCT/US07/71096; Mailing date May 13, 2008.
PCT Search Report for PCT/US2011/033813; Mailing Date Jul. 28, 2011.
Written Opinion of the International Searching Authority for PCT/US2011/033813; Mailing Date Jul. 28, 2011.
Stolowitz Ford Cowger Listing of Related Cases Mar. 15, 2012.
International Search Report for PCT/US09/04654; Date of mailing Oct. 2, 2009.
Written Opinion of the International Searching Authority; PCT/US09/04654; Date of mailing Oct. 2, 2009.
Holloway, et al., "Cryptographic Initialization Test", IBM Technical Dsiclsoure Bulletin, pp. 195-198, Feb. 1991.
Bishop, Matt et al., "A Model of Security Monitoring", Department of Mathematics and Computer Science, Dartmouth College, pp. 46-52. Dec. 1989.
Peter Brusilovsky et. al., "Adaptive and Intelligent Web-based Educational Systems," International Journal of Artificial Intelligence in Education, Apr. 1, 2003, pp. 159-172, XP55039152, The Netherlands Retrieved from the Internet: URL: http://www.sis.pittedu/~-peterb/papers/AIWBES.pdf [retrieved on Sep. 25, 2012] p. 160-161.
Atterer R et al. : "Knowing the User's Every Move- User Activity Tracking for Website Usability Evaluation and Implicit Interaction," WWW '06 Proceedings of the 15th World Wide Web, ACM, New York, NY, USA, May 22, 2006, pp. 203-212, XP002519605, DOI: 10.1145/1135777.1135811 ISBN 978-1-5959-323-2.
International Search Report for PCT/US2013/023636; Date of Mailing Aug. 13, 2013.
Written Opinion of the International Searching Authority for PCT/US2013/023636; Date of Mailing Aug. 13, 2013.
Communication from the EP Patent Office pursuant to Article 94(3) EPC in EP Application No. 09806979.2; dated Jan. 6, 2014.
Reed Martin; Using Google Analytics Site Overlay; Community Spark; Apr. 13, 2007. Online: <http://www.communityspark.com/using-google-analytics-site-overlay/>.

\* cited by examiner

METHOD AND APPARATUS FOR INTELLIGENT CAPTURE OF DOCUMENT OBJECT MODEL EVENTS

The present application is a continuation-in-part of U.S. patent application Ser. No. 12/904,356, entitled: DYNAMICALLY CONFIGURED SESSION AGENT, filed Sep. 14, 2010 which claims priority to U.S. Provisional Patent Application Ser. No. 61/332,498 filed on May 7, 2010 which are both herein incorporated by reference in their entireties.

The present application is also a continuation-in-part of U.S. patent application Ser. No. 12/191,585, entitled: METHOD AND SYSTEM FOR COMMUNICATION BETWEEN A CLIENT SYSTEM AND A SERVER, filed Aug. 14, 2008 which is also herein incorporated by reference in its entirety.

The present application is also a continuation-in-part of U.S. patent application Ser. No. 13/337,905, entitled: METHOD AND APPARATUS FOR MONITORING AND SYNCHRONIZING USER INTERFACE EVENTS WITH NETWORK DATA, filed Dec. 27, 2011, which is a continuation of U.S. patent application Ser. No. 11/616,616, filed Dec. 27, 2006, now U.S. Pat. No. 8,127,000 issued Feb. 28, 2012, which claims priority to Provisional Application No. 60/806,443, filed on Jun. 30, 2006 which are all herein incorporated by reference in their entirety.

BACKGROUND

Known monitoring systems may capture and analyze web sessions. The captured web sessions can be replayed at a later time to identify problems in web applications and obtain website analytics. The monitoring systems may insert extensive instrumentation in the web application that log user session events, user actions, and webpage metadata (performance, etc). This style of logging might be performed by a client device, a server, or both.

Significant challenges may exist bringing together and replaying dispersed log files. The challenge from a replay perspective involves accurately stitching together the user experience from the log files obtained across multiple tiers. For example, some events may not be observable and therefore might not be captured during the web session. If events are not captured, the replayed web session may not reproduce the same states that occurred during the original web session. As a result, the replayed web session may not identify problems that happened during the original web session or may generate errors that never actually happened during the original web session.

The challenge from a physics perspective includes generating log files and moving the log files into a central repository without adversely affecting the original web session. Capturing and storing web session data uses client computer bandwidth and network bandwidth. The additional bandwidth usage might slow down the web session and cause the user to take evasive actions, such as aborting the web session.

DETAILED DESCRIPTION

Figure 1:
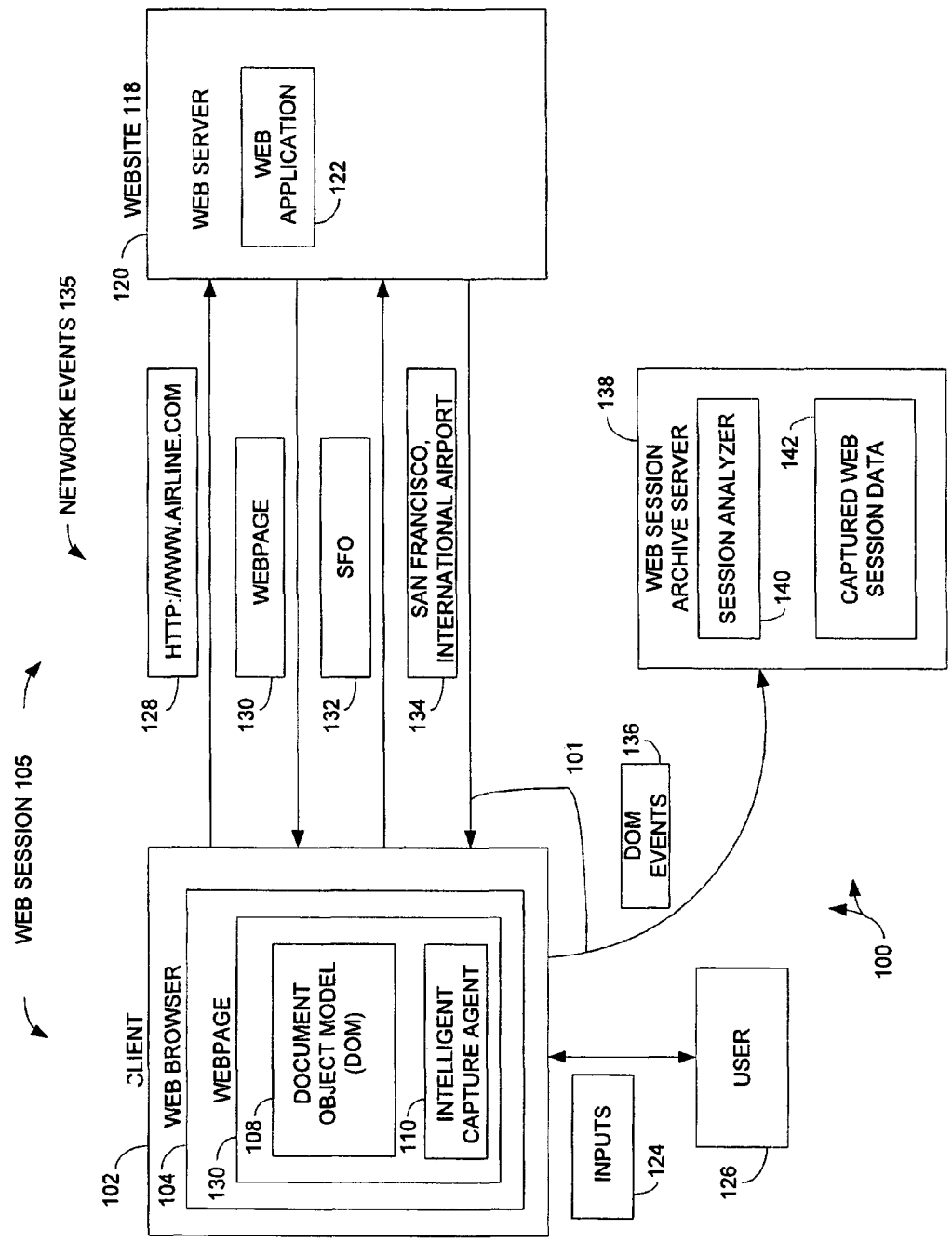
FIG. 1 depicts an example of a system for capturing Document Object Model (DOM) events.

FIG. 1 depicts an example of an intelligent capture system 100 configured to capture a web session 105. A website 118 may comprise a web server 120 configured to operate a web application 122. Web application 122 may be configured to conduct web session 105 with a client 102. Web application 122 may comprise software, and a database containing multiple webpages and data for exchanging with client 102 during web session 105. For example, web application 122 may contain webpages and data for products available for purchasing from an on-line shopping website. Of course this is only one example and web application 122 may comprise any website application configured to conduct web sessions for any enterprise or entity.

A network 101 may connect client 102 to web server 120 and also may connect client 102 to a web session archive server 138 configured to store web session data 142 captured during web session 105. Network 101 may comprise any combination of Local Area Networks (LANs), Wide Area Networks (WANs), Internet Protocol (IP) networks, phone networks, Public Services Telephone Networks (PSTN), wireless networks, cellular networks, Wi-Fi networks, Bluetooth networks, cable networks, data buses, or the like, or any combination thereof used for transferring information between client 102 and web server 120.

Client 102 may operate on any computing device configured to participate in web session 105 with web server 120. For example, client 102 may comprise a tablet computer, hand-held device, smart telephone, mobile telephone, personal digital assistant (PDA), laptop computer, personal computer, computer terminal, voice over internet protocol (VoIP) phones, or the like, or any combination thereof.

A user 126 may open a web browser 104 within a screen of client 102 and send a Hypertext Transfer Protocol (HTTP) request 128 over network 101 to web application 122. Web application 122 may send a webpage 130 back to web browser 104 in response to HTTP request 128. Web browser 104 may load and render webpage 130 on the computer screen of client 102. In another example, web application 122 may operate an application server that communicates with an application running on client 102. In this example, web browser 104 may not be used and the application running on client 102 may communicate and exchange data directly with the application server operating within website 118.

Any combination of data and control logic may exist within webpage 130. For example, webpage 130 may comprise Hypertext Markup Language (HTML), Extensible Markup Language (XML), Cascading Style Sheets (CSS), JavaScript, Asynchronous JavaScript and XML (or other data provider) (AJAX), or the like, or any combination thereof. Webpage 130 may be configured into a Document Object Model (DOM) 108 that defines a logical structure of an electronic document and the way the electronic document is accessed and manipulated.

User 126 may enter inputs 124 into webpage 130 via web browser 104. For example, webpage 130 may be part of an airline website and user 126 may enter text characters into a destination field displayed within webpage 130 for an airline destination. JavaScript within webpage 130 may send a request 132 to web application 122 that contains the user input 124. For example, request 132 may include the letters "SFO" entered by user 126 into the airline destination field displayed in webpage 130.

Web application 122 may respond to request 132 with a reply 134 that contains updates for webpage 130. For example, web application 122 may send back data in reply 134 identifying San Francisco International Airport. Web browser 104 then may display the data from reply 134 within webpage 130. For example, webpage 130 may display a dropdown menu that identifies San Francisco International Airport. Any combination of requests 128 and 132, and replies 130 and 132, may be exchanged between web browser 104 and web application 122 during web session 105.

Requests 128 and 132, and replies 130 and 132, are alternatively referred to as network events 135. User inputs 124 are alternatively referred to as user events 124. Any network events 135, user events 124, or any other logic that may change a state of the DOM 108 within webpage 130 may be referred to as a DOM event 136.

An intelligent capture agent 110 may be configured to capture DOM events 136 during web session 105 between client 102 and web application 122. Capture agent 110 may comprise JavaScript added into the webpages sent by web application 122. Capture agent 110 may send captured DOM events 136 to archive server 138. Archive server 138 may store captured DOM events 136 as captured web session data 142. Captured web session data 142 then may be replayed and analyzed at a later time. For example, an administrator of website 118 may replay captured web session data 142 to generate analytics for web session 105 and identify any problems with web application 122.

Capture agent 110 more efficiently captures DOM events 136 for web session 105. Capture agent 110 could try and capture every network event 135 and every user event 124 during web session 105. During replay, captured user events 124 could be applied to captured webpages in network events 135 to reproduce the prior states of webpage 130. However, using capture agent 110 to capture all of the network events 135 and user events 124 may substantially slow down web session 105. For example, web browser 104 may take longer to receive and load webpage 130 and webpage updates 134. This may cause user 126 to respond differently during web session 105 or abort web session 105.

In addition, not all user events 124 entered by user 126 may be successfully captured. For example, hostile HTML code within webpage 130 may prevent inputs or webpage changes from percolating to a level observable by capture agent 110. In another example, network problems may prevent some captured DOM events 136 from being successfully transmitted to archive server 138. Therefore, captured web session data 142 may not include all of the events from original web session 105. The missing events may prevent accurate replay of the original web session 105.

For example, a first input 124 may cause webpage 130 to display a particular field and the user may enter a second input 124 into the newly displayed field. If the first input 124 is not successfully captured, replay may not generate the field. Since the field is not generated, replaying the second input 124 may create an error condition that never happened during original web session 105. Thus, failing to capture even one web session event may prevent accurate replay of original web session 105.

Intelligent capture agent 110 is configured to intelligently capture DOM events 136 for webpage 130. The intelligent capture of DOM events 136 reduces an overall amount of data that needs to be captured and transferred to archive server 138. Thus, capture agent 110 is less likely to slow down web session 105 and adversely affect the user experience during web session 105.

Intelligent capture of DOM events 136 also increases accuracy while replaying web session 105. During different stages of web session 105, capture agent 110 may capture an entire DOM state of webpage 130. The captured DOM state of webpage 130 may contain the results from web session events that may have otherwise been undetected or unsuccessfully captured. The captured DOM state of webpage 130 operates as a checkpoint and allows the replay engine to resynchronize to a previously existing state of original web session 105. This allows a replay engine to more accurately recreate original web session 105.

The operating environment used during original web session 105 may be different from the operating environment used during replay. For example, a first web browser 104 may be used during original web session 105 and a second different web browser may be used to replay the captured web session. Webpage 130 may operate differently on different web browsers. Replaying captured DOM events 136 may provide a more consistent and accurate simulation of original web session 105 on a wider variety of different web browsers and operating conditions.

Many webpages may include links to multiple third party websites. For example, webpage 130 provided by website 118 may include multiple advertisements with links to other third party websites. Some monitoring systems may only capture network events for one website. For example, a monitoring system might only capture network events 135 exchanged with website 118. Capture agent 110 may be configured to selectively capture information exchanged with third party websites for more through capture of web session 105.

Figure 2:
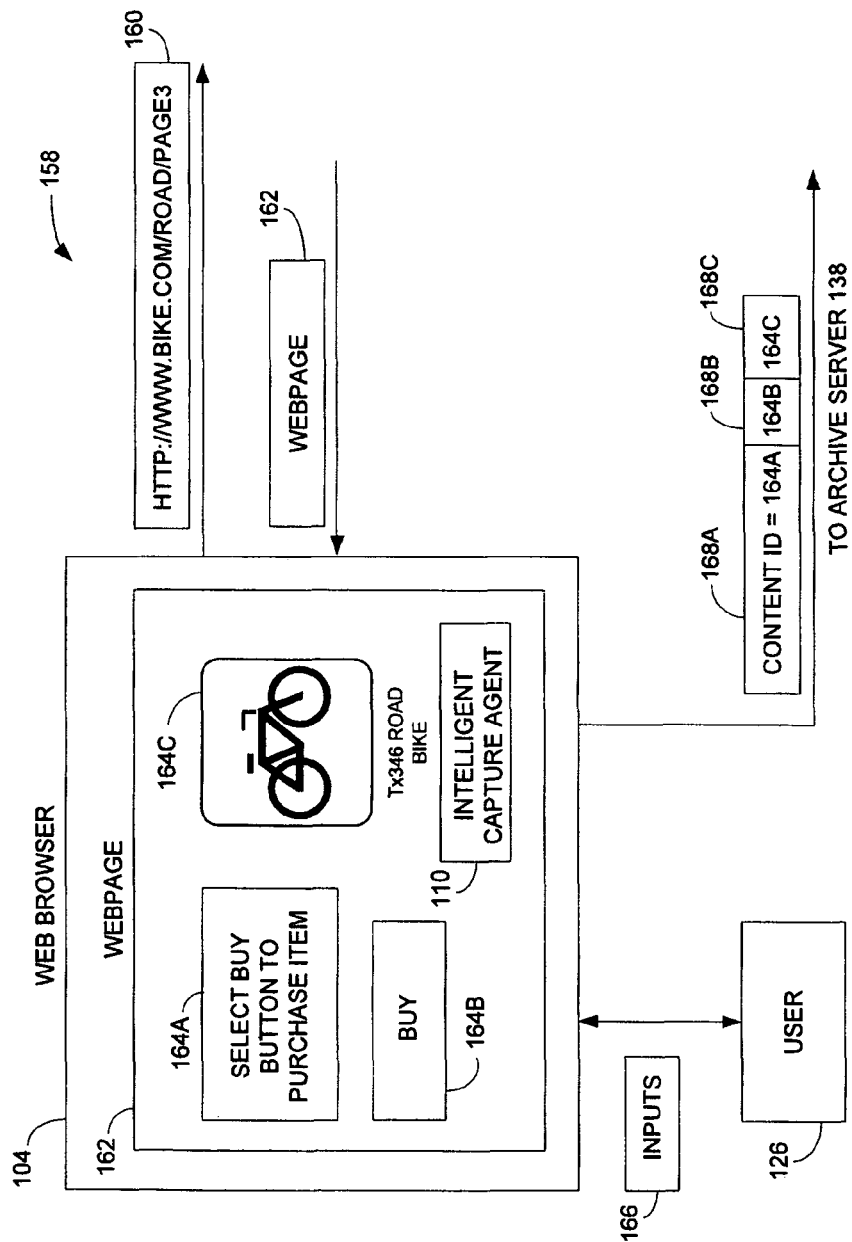
FIG. 2 depicts an example of an intelligent capture agent configured to capture Document Object Model (DOM) items for a webpage.

FIG. 2 depicts an example of a capture agent 110 configured to capture a web page 162. User 126 may enter inputs 166 that cause web browser 104 to initiate a request 160 to a website. For example, user 126 may click on a link to a website that causes web browser 104 to send a Hypertext Transfer Protocol (HTTP) request 160 to a website that sells bicycles. A web application on the bicycle website may send back webpage 162 in response to request 160.

Web browser 104 receives and renders webpage 162 on the screen of a client computing device. In this example, webpage 162 may include multiple different DOM items 164. For example, a first DOM item 164A may comprise text prompting user 126 to purchase a particular product. A second DOM item 164B may comprise an icon button configured to detect a mouse click, keystroke, and/or screen touch. A third DOM item 164C may comprise an image 164C of the product for sale.

Capture agent 110 may need to capture all of DOM items 164 when webpage 162 is initially received and loaded by web browser 104. Some or all of DOM items 164 may be repeatedly and/or statically displayed on webpage 162. For example, webpage 162 may be the home page for the bicycle website. Home webpage 162 may always contain the same known DOM items 164A-164C. Some of DOM items 164A-164C also may be displayed within other webpages for the bicycle website.

Other DOM items 164 contained within webpage 162 and may be unique for each user 166 or may continuously change. For example, some websites may include different advertisements personalized to user 126. Other DOM items may constantly change while being displayed within webpage 162. For example, a stock market report or a news report within webpage 162 may constantly change each time webpage 162 is downloaded or each time webpage 162 is refreshed within web browser 104.

Capture agent 110 may be configured to identify known DOM items within webpage 162. For example, empirical data may be obtained by observing prior web sessions for the bicycle website and known DOM items 164 may be identified that remain static, contain substantial amounts of data, and/or are repeatedly displayed in different webpages.

Capture agent 110 may be programmed to detect known DOM items 164 and generate content identifiers or code words 168 that represent the information in the known DOM items. For example, capture agent 110 may look for any text within webpage 162 that begins with the phrase SELECT BUY BUTTON. Based on empirical data, the identified phrase may always be associated with the text in DOM item 164A. Instead of capturing the entire text of DOM item 164A, capture agent 110 can then send a content identifier 168A to archive server 138 representing DOM item 164A.

Content identifier 168A can be used during replay of web session 158 to reproduce the entire text of DOM item 164A. For example, the replay engine may reference a table containing the text associated with content identifier 168A. During replay, the replay engine may detect content identifier 168A within the captured web session data. The replay engine may use content identifier 168A as an index to identify associated text SELECT BUY BUTTON TO PURCHASE ITEM in the table and display the identified text within webpage 162.

Text, JavaScript, images, control, or any other DOM item or data may be represented with content identifiers 168. For example, DOM item 164B may comprise an icon button and may be associated with a second content identifier 168B and DOM item 164C may comprise an image and may be associated with a third content identifier 168C. DOM items 164B and 164C also may be pre-stored in the replay table along with DOM item 164A. DOM items 164B and 164C may be accessed and displayed within webpage 162 during replay in response to the replay engine detecting the associated content identifiers 168B and 168C, respectively. Thus, capture agent 110 may identify DOM items 164 in webpage 162 without having to capture and send the content of the DOM items 164 to the archive server. This may reduce the amount of processing required to capture web session 158.

A portion of a DOM item 164 may be represented by a content identifier 168 and another portion of the same DOM item 164 may be captured. For example, text in DOM item 164A may also include a specific name of the product being offered for sale. Capture agent 110 may capture and send the name of the product to archive server 138. The remaining generic text in DOM item 164A may be represented by content identifier 168A and may also be sent to the archive server 138. The replay engine then accesses the text from the replay table associated with content identifier 168A and inserts the previously captured product name into the appropriate location within the text.

Figure 3:
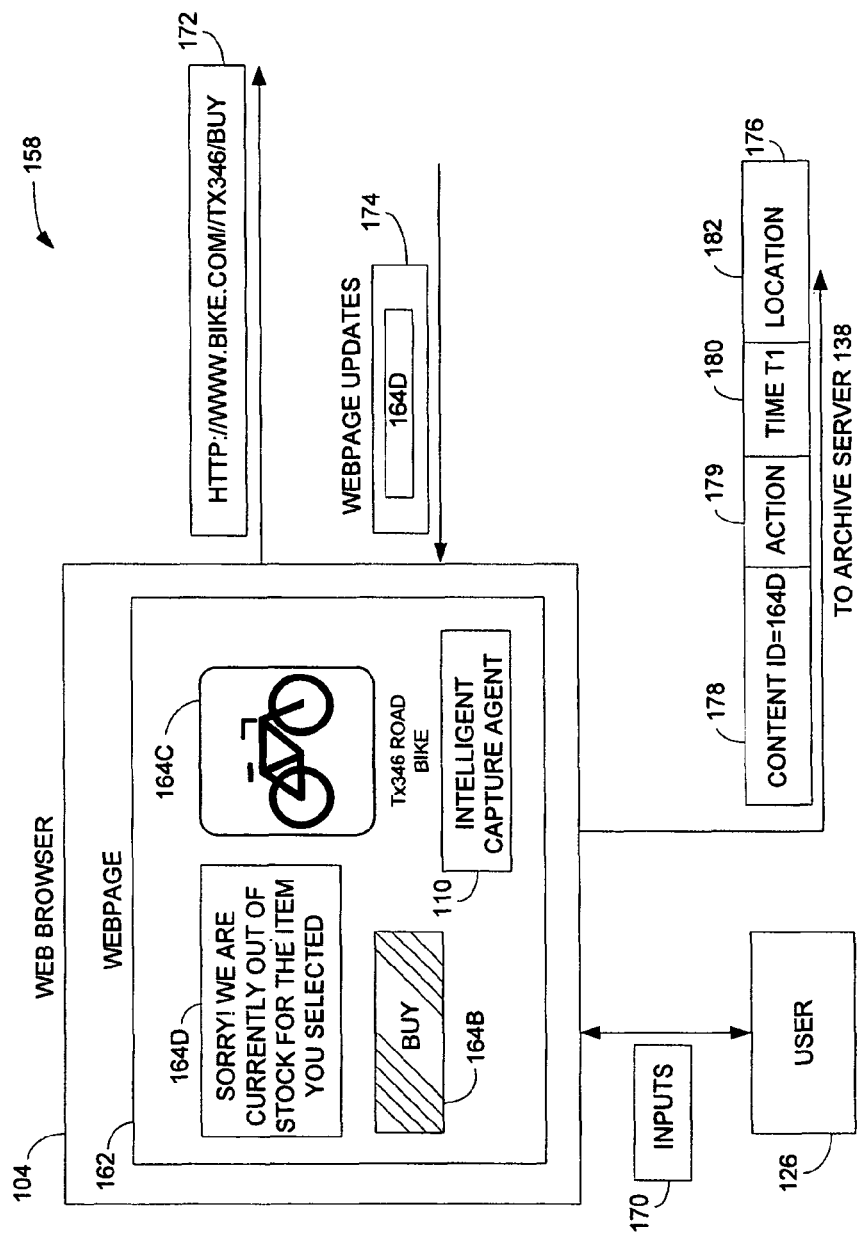
FIG. 3 depicts an example of an intelligent capture agent configured to capture DOM changes.

FIG. 3 depicts an example of a capture agent 110 configured to identify DOM changes in webpage 162. In this example, user 126 may have selected the icon button for DOM item 164B. Web browser 104 may have sent a request 172 in response to selection of the icon button. For example, HTTP request 172 may request purchase of the bicycle displayed on webpage 162.

The web application on the bicycle website may send back a response 174 in response to request 172. Response 174 may be an update to currently displayed webpage 162 or may be a completely new webpage. Content in response 174 may comprise any text, images, data, control, fields, or the like, or any combination thereof. In this example, the bicycle selected for purchase by user 126 may be out of stock. The web application on the bicycle website may send back DOM item 164D in response 174 comprising text indicating that the bicycle selected for purchase by user 126 is currently out of stock.

Capture agent 110 may detect a DOM change within webpage 162. For example, capture agent 110 may detect replacement of DOM item 164A previously shown in FIG. 2 with the new text contained in DOM item 164D. Capture agent 110 also may determine that no other DOM items 164 have changed within webpage 162. One technique for detecting DOM changes may comprise examining a DOMSUBTREE MODIFIED JavaScript message on webpage 162.

Capture agent 110 may be preprogrammed to look for any DOM items 164 that contain known content. For example, every time a product is out of stock, the web application for the bicycle website may generate the same message SORRY! WE ARE CURRENTLY OUT OF STOCK FOR THE ITEM YOU SELECTED. Capture agent 110 may determine DOM item 164D contains the known out of stock message. Instead of capturing the entire text message in DOM item 164D, capture agent 110 may generate a content identifier or codeword 178 representing the out of stock text message.

Capture agent 110 may send content identifier 178 back to archive server 138 in a message 176. Message 176 also may include an action 179, a timestamp 180, and a location 182 associated with content identifier 178. Action 170 may identify any selection, display, or other control associated with DOM item 164D. Timestamp 180 may identify when DOM item 164D was detected within webpage 162 and location 182 may identify where DOM item 164D was displayed within webpage 162.

In another example, a webpage may only be displayed after a user logs into a website. For example, a user may have to enter a username and password in order to log into a bank account webpage. Bank account information also may be unique to each user and also may constantly change over time. However, other information on the bank webpage, such as a bank banner or advertisements may be static and displayed on webpages for each user while the user views their bank accounts.

All of the DOM elements of the bank webpage may need to be initially captured since the bank webpage cannot be reproduced during replay without an authorized user name and password. User bank account information on the bank webpage might not be able to be represented by an associated content identifier 178, since the bank account information constantly changes over time. Accordingly, capture agent 110 may capture the bank account information, assign a timestamp and location to the captured bank account information, and send the captured information to archive server 138.

In one example, the account information may be displayed in a particular format, such as a Graphics Interchange Format (GIF) image or a Joint Photographic Experts Group (JPEG) image. Based on empirical data, capture agent 110 may be configured to associate certain data formats with changing or unknown information. Accordingly, capture agent 110 may capture data having particular data formats. Other information displayed on the bank webpage may comprise known data that is displayed to every user. Capture agent 110 may detect the known data and generate an associated content identifier, action, time stamp, and location. The content identifier and associated display information then may be sent to archive server 138.

Capture agent 110 may operate in conjunction with other monitoring devices. For example, capture agent 110 may operate in combination with a network session monitor that captures network data as described in U.S. Pat. No. 8,127,000 entitled: METHOD AND APPARATUS FOR MONITORING AND SYNCHRONIZING USER INTERFACE EVENTS WITH NETWORK DATA, issued Feb. 28, 2012, which is herein incorporated by reference. However, in another example, capture agent 110 may capture the entire web session without using network data captured by a web session monitor.

Capture agent 110 may reduce the amount of data that needs to be captured and transmitted to archive server 138 for web session 158 by identifying and capturing the changes in webpage 162 instead of the entire webpage 162. Capture agent 110 can also reduce processing and network utilization by representing large amounts of data with content identifiers 178.

Figure 4:
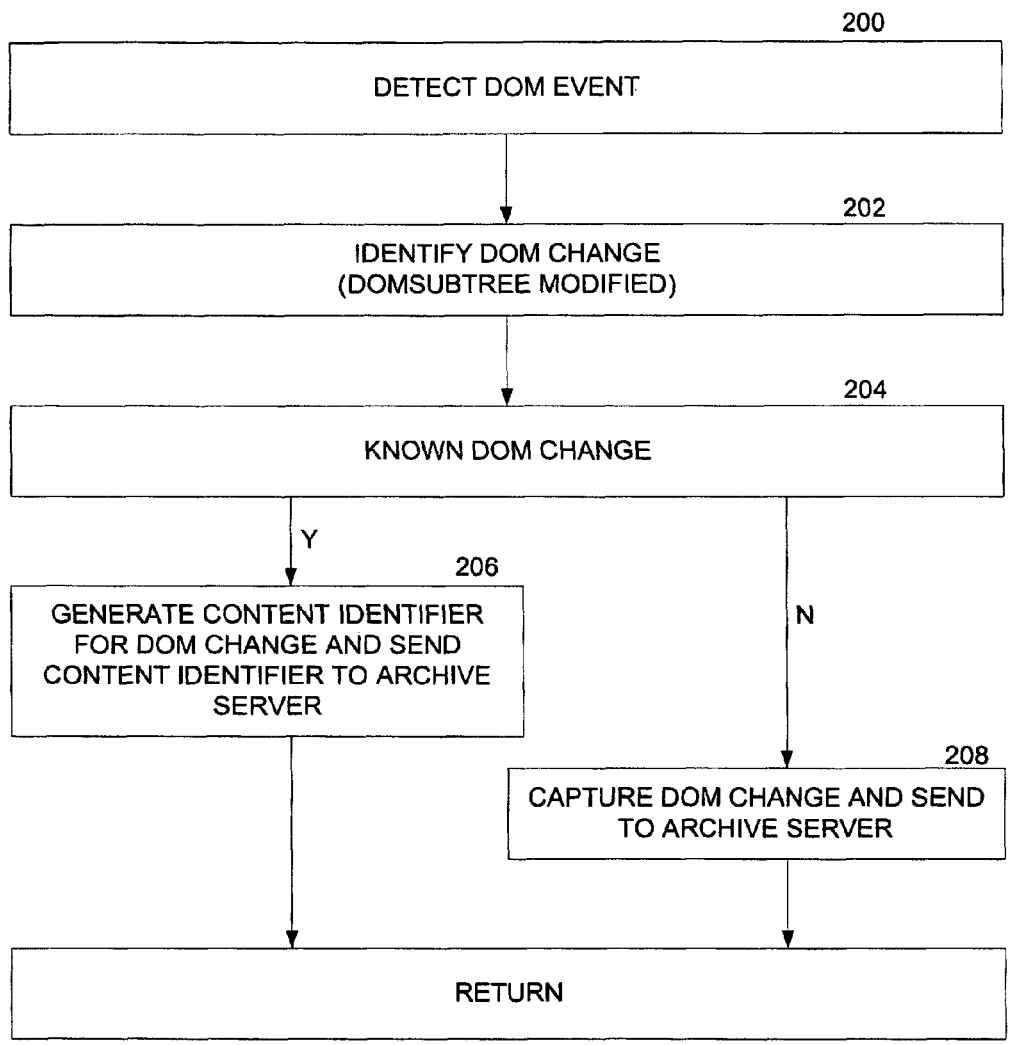
FIG. 4 depicts an example of a process for capturing DOM events.

FIG. 4 depicts a process for intelligently capturing DOM events. In operation 200, the capture agent may detect a DOM event. The DOM event can be associated with any event, change, or data in a web session. For example, the DOM event may comprise loading a new webpage into a web browser, a change in information displayed in the webpage, a user input, a change in HTML code in the webpage, a JavaScript control operation, an asynchronous HTTP request or response, or the like, or any combination thereof.

In operation 202, the capture agent may identify the DOM changes in the webpage. For example, the web browser may have downloaded a new webpage from a website and the capture agent may determine that all of the DOM items in the new webpage need to be captured. In another example, the capture agent may determine that only one, or a few, DOM items changed within a particular DOM subtree of the webpage. The capture agent then may only need to capture the DOM changes in the identified DOM subtree. As explained above, a JavaScript DOMSUBTREE MODIFIED message may be examined in the webpage to identify the DOM changes.

In operation 204, the capture agent may determine if any of the identified DOM changes can be represented by a content identifier. As explained above, many DOM changes in a web page may comprise known content that may be repeatedly displayed to different users. The capture agent can be preprogrammed to identify the known DOM changes in operation 204. For example, the capture agent may look for a particular word combination, image name, data format, etc.

In operation 206, the capture agent may generate a content identifier or code word that represents the known DOM changes and send the content identifier to the archive server. During replay, the content identifier is replaced with the actual content for the DOM change that was previously displayed on the webpage during the web session.

In operation 204, the capture agent may not be able to represent the DOM change with a content identifier. For example, the webpage may display unique bank account information for the user. In operation 208, the capture agent may capture the DOM change and send the captured DOM change to the archive server. For example, the capture agent may use the DOMSUBTREE MODIFIED object to identify a DOM value. The identified DOM value may be copied and sent along with an associated action identifier, time stamp identifier, and location identifier to the archive server.

Figure 5:
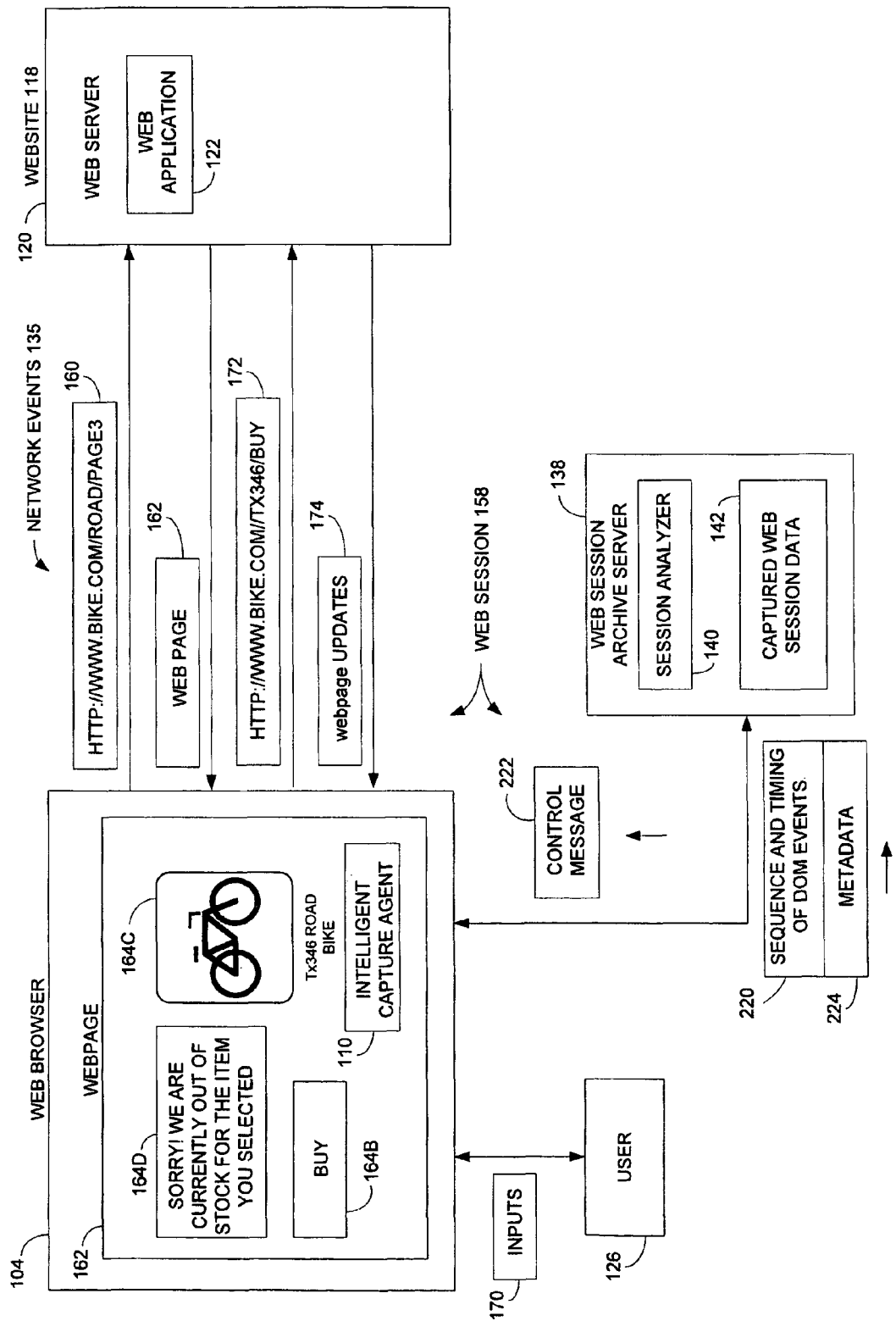
FIG. 5 depicts an example of an intelligent capture agent configured to dynamically capture DOM events.

FIG. 5 depicts an example of a capture system configured to dynamically capture DOM events. During web session 158, user 126 may generate inputs 170 that initiate network events 135. For example, web browser 104 may send different network requests 160 and 172 to web application 122 and receive back responses 162 and 174, respectively. User 126 may generate other inputs 170 that may only result in local changes in webpage 162 without initiating network events 135.

Web session 158 may normally proceed in a particular sequence with an associated timing. For example, a first DOM event in web session 158 may start with a user initiating HTTP request 160. A second DOM event may comprise web browser 104 loading web page 162. There may be a delay while web browser 104 loads web page 162 and user 126 reviews webpage 162. A third event may comprise web browser 104 receiving another user input 170. A fourth event may comprise sending network request 172 from web browser 104 to web application 122 requesting additional information. A fifth DOM event may comprise web browser 104 receiving response 174 back from web application 122 containing webpage updates.

Capture agent 110 and/or session analyzer 140 may monitor the sequence and timing of these DOM events 220. Based on the sequence and timing, different capture operations may be performed by capture agent 110. For example, the sequence of DOM events 220 may indicate an unusual delay associated with a user reviewing web page 162. Accordingly, capture agent 110 may capture a current state of webpage 162. For example, capture agent 110 may capture all of DOM items 164 within webpage 162 and send the captured DOM items to archive server 138. The state for webpage 162 can then be reproduced during replay to better identify possible problems that might have happened during original web session 158 when the irregularity was originally detected.

In one example, capture agent 110 may send captured DOM events 220 to archive server 138. Session analyzer 140 may monitor the sequence and timing for DOM events 220. Based on empirical data obtained from prior web sessions, session analyzer 140 may identify irregularities in the sequence and/or timing of DOM events 220. If an irregularity is detected, session analyzer 140 may send a control message 222 instructing capture agent 110 to capture a current DOM state of webpage 162.

Control message 222 may dynamically direct capture agent 110 to capture specific DOM items associated with the identified irregularity. For example, control message 222 may direct capture agent 110 to capture content in a particular data field when the irregularity is associated with a user response. In another example, session analyzer 140 may direct capture agent 110 to capture network or client computer processing or memory capacity information when the irregularity is associated with a slower than normal sequence of DOM events.

In yet another example, capture agent 110 may send metadata 224 along with captured DOM events 220. Metadata 224 provides additional descriptive information about webpage 162. Typical metadata 224 might include keywords, a description, author, date of update, or other information describing webpage 162. Other metadata may identify different types of data, such as images within webpage 162.

Session analyzer 140 may dynamically determine what DOM events 220 to capture in webpage 162 based on metadata 224. For example, metadata 224 may identify an image in webpage 162 that repeatedly changes. The image may comprise a face where the eyes on the face continue to change directions. Session analyzer 140 may determine that these changes in the image data do not need to be repeatedly captured and may send control message 222 directing capture agent 110 not to capture the image changes.

In another example, capture agent 110 may monitor the sequence and timing of DOM events 220 and autonomously determine what DOM events to capture based on the sequence and timing of DOM events 220. Similarly, capture agent 110 may autonomously determine what DOM events to capture based on metadata 224 for webpage 162.

In yet another example, session analyzer 140 may send an artificial stimulation of the DOM, herein referred to as a tickle, in control message 222. The DOM tickle may force a DOM change in webpage 162. Session analyzer 140 could send a first control message 222 directing capture agent 110 to capture a current DOM state of webpage 162. Session analyzer 140 could then send the DOM tickle forcing a known DOM change in webpage 162. For example, the DOM tickle may comprise a user input, content, or logic for insertion into webpage 162 that should generate a known response in webpage 162. If DOM events 220 received back from capture agent 110 in response to the DOM tickle are not what are expected, session analyzer 140 may send a control message 222 directing capture agent 110 capture a complete DOM state for webpage 162 and/or may attach an error message to captured web session data 142.

Figure 6:
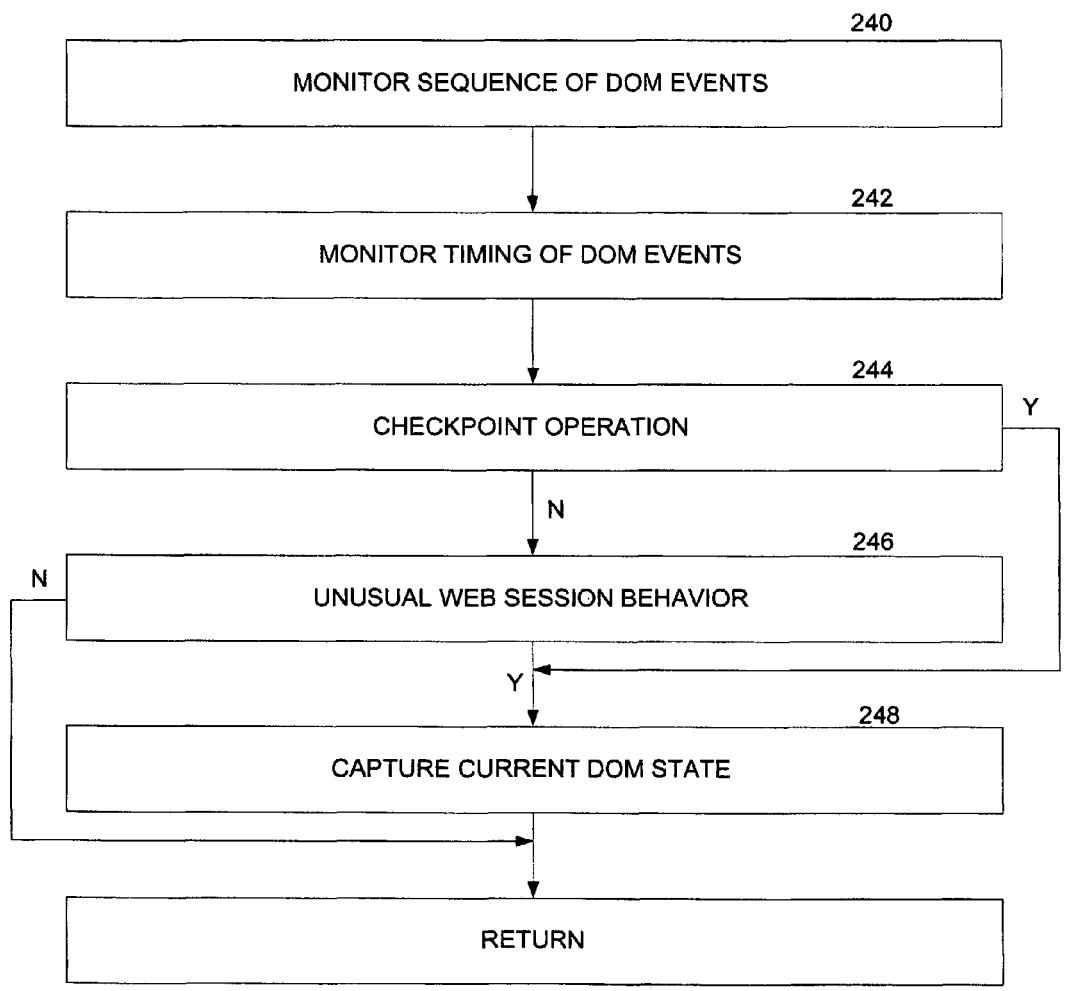
FIG. 6 depicts an example of a process for capturing a webpage DOM state based on checkpoint events.

FIG. 6 depicts an example of a process for capturing DOM events for a web session. Either the capture agent and/or the session analyzer may perform the operations described below. In operation 240, a sequence of DOM events are monitored and in operation 242 timing between the DOM events are monitored. For example, network events, user events, and state changes in the webpage are monitored.

In operation 244, certain DOM events, or a sequence of DOM events, may prompt a checkpoint operation. For example, a new webpage loaded into the web browser may need to be captured and therefore identified for a checkpoint operation. In another example, a webpage rendered by the web browser for some period of time may be identified as a checkpoint operation.

In operation 248, the capture agent may capture a current DOM state of the webpage in response to an identified check point operation in operation 244. Capturing the current DOM state may comprise capturing some or all of the HTML, CSS and/or JavaScript within the webpage. Capturing the entire DOM state of the webpage allows resynchronization of the web session during replay. For example, missed DOM events may prevent the replay engine from reproducing the same states that happened during the original web session. The DOM state captured during the checkpoint operation can be replayed to force a previous state of the original web session. Otherwise, a missed DOM event could prevent the replay engine from accurately reproducing any subsequent web session states.

In operation 246, the sequence and timing of DOM events may be analyzed to identify any other unusual web session behavior. For example, an unusually long time gap may exist between two DOM events. In another example, no transition may exist between a first DOM event and a normally expected second DOM event. The unusual sequence or timing of DOM events may be caused by client computer problems, network problems, web application problems, or user problems. If an unusual web session sequence or timing is detected in operation 246, the current DOM state also may be captured in its entirety in operation 248.

Figure 7:
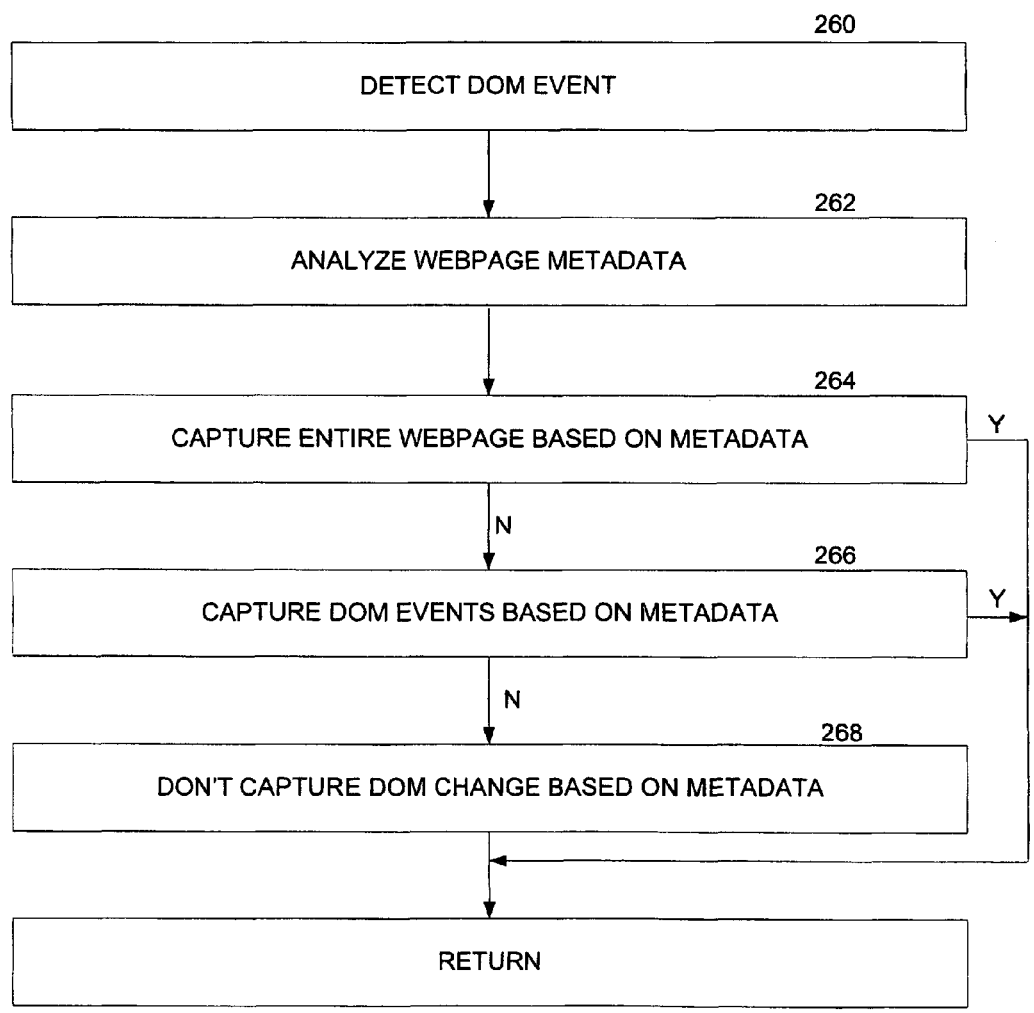
FIG. 7 depicts an example of a process for capturing different DOM events based on webpage metadata.

FIG. 7 depicts an example of a process for capturing DOM events based on webpage metadata. In operation 260, a DOM event may be detected. For example, an image may change within the webpage. In operation 262, the metadata for the webpage may be analyzed and DOM events may be captured based on the metadata. For example, operation 264 may capture the entire webpage based on the metadata. The metadata may indicate that the webpage has been rendered for a particular amount of time or that a particular network condition happened that requires capture or recapture of the entire webpage.

In operation 266, particular DOM items or types of data may be captured based on the metadata. For example, data from particular fields in the webpage may be captured based on the metadata. In operation 268, some DOM changes may not be captured based on the metadata. For example, particular types of data identified by the metadata may only need to be captured when the webpage is initially loaded into the web browser. Subsequent changes to the same types of data may not provide material web session information during replay and are therefore not captured.

Figure 8:
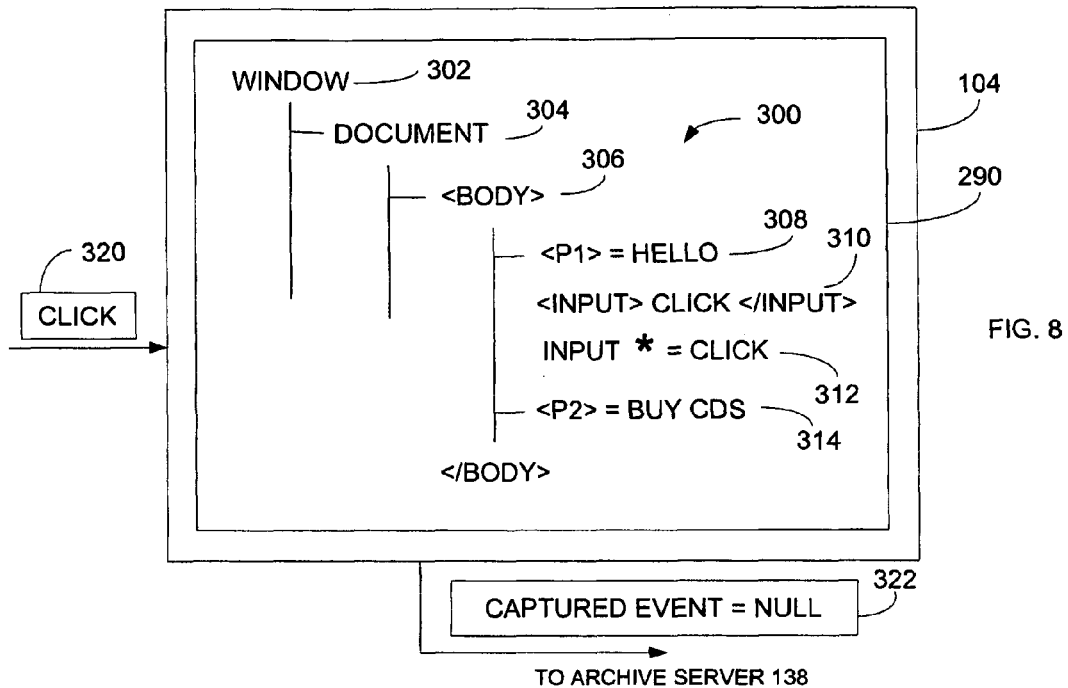
FIG. 8 depicts an example of a DOM tree structure for a webpage.

FIG. 8 depicts an example of a DOM tree structure 300 for a webpage 290 displayed by a web browser 104. DOM tree structure 300 may comprises a top level window 302 and a sublevel document 304. Document 304 may comprise a body 306 with paragraphs 308 and 314. Paragraph 308 may comprise the text HELLO and paragraph 314 may comprise the text BUY CDS. Control code 310 may monitor for a selection of paragraph 308. For example, control code 310 may detect a user mouse click or keystroke selection 320 on the HELLO text of paragraph 308.

Capture code 312 may be inserted into webpage 290 to capture the user input 320. Capture code 312 and other JavaScript code may be embedded in multiple different sections of DOM tree structure 300. Hostile code in webpage 290 may prevent user input 320 from propagating to a top level of DOM tree structure 300 and prevent capture code 312 from capturing user input 320. Accordingly, no captured events 322 are sent to archive server 138. Missed user input 320 may prevent the replay engine from generating the correct states for webpage 290 and prevent accurate simulation of the web session.

Figure 9:
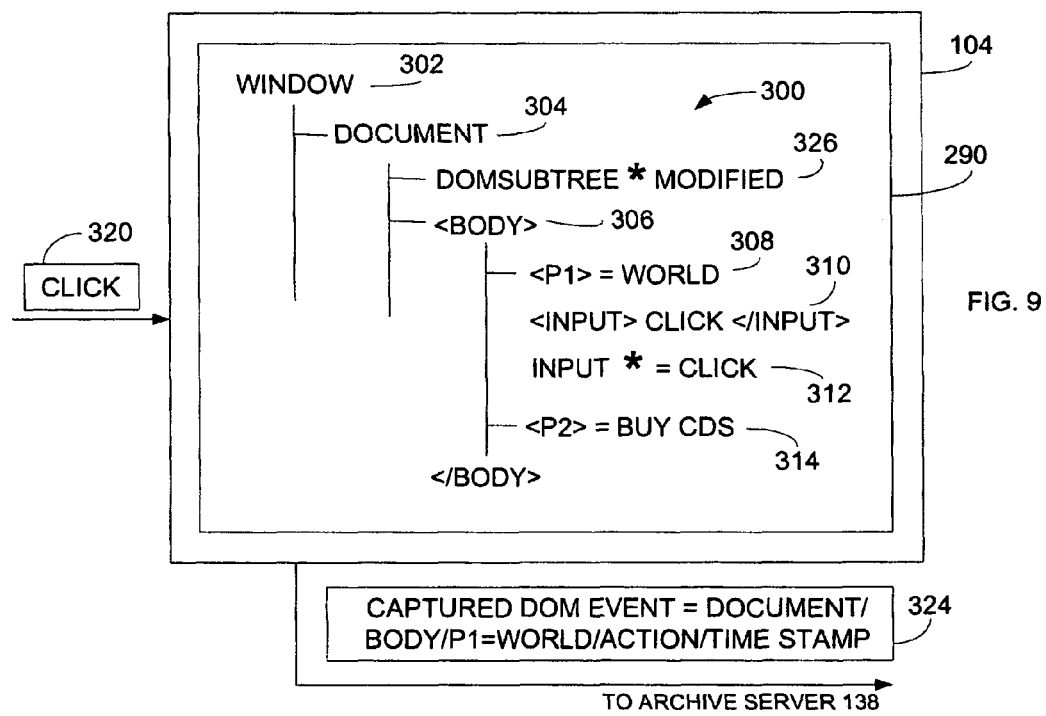
FIG. 9 depicts an example of objects configured to capture DOM changes in a webpage.

FIG. 9 depicts an example of code used a capture agent to more effectively capture DOM events in DOM tree structure 300. A DOMSUBTREE MODIFIED JavaScript message 326 may be located in DOM tree structure 300 and may be configured to detect DOM changes. Instead of monitoring for input 320, object 326 detects changes in DOM tree structure 300. This allows the capture agent to capture DOM events that may not have otherwise been captured.

For example, user input 320 may cause text in paragraph 308 to change from HELLO to WORLD. Even without capturing user input 320, object 320 still may capture the result of click 320, namely, the change in paragraph 308 from HELLO to WORLD. The change in paragraph 308 is captured as DOM event 324 and sent to archive server 138. During replay, the replay engine may come to the web session state where user input 320 was previously entered by the user.

Even through user input 320 was not successfully captured during the original web session, the replay engine can successfully move to the next correct state of the original webpage 290 by replaying captured DOM event 324. Thus, the replay engine may continue replaying the captured web session from the forced state provided by captured DOM event 324. The DOMSUBTREE MODIFIED JavaScript message 326 is also located at a higher level of the DOM tree structure 300 and therefore may be less evasive and easier to examine within webpage 290.

Object 326 may be used in combination with capture code 312. For example, code 312 still may try and capture user input 320 and the replay engine still may try and generate the next webpage state by applying captured user input 320 to webpage 290. Object 326 may operate as a backup mechanism in case user input 320 is not successfully captured. In another example, some or all of the original web session may be captured using only object 326 and code 312 may not be embedded into associated portions of some webpages. In this example, the replay engine may simulate the different webpage states solely by replaying captured DOM events 324.

Figure 10:
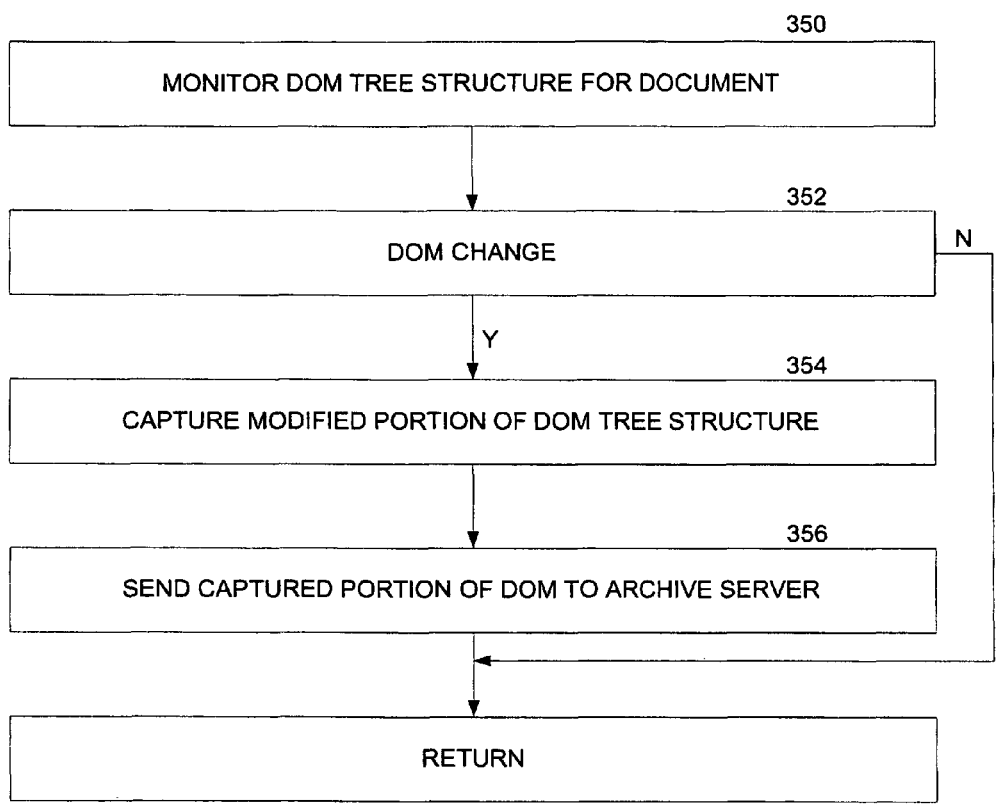
FIG. 10 depicts an example of a process for capturing DOM events in a webpage.

FIG. 10 depicts an example process for capturing DOM changes. In operation 350, an object monitors a DOM tree structure for an electronic document. In operation 352, DOM changes are identified within the DOM tree structure. For example, the DOMSUBTREE MODIFIED JavaScript message may identify any changes in the DOM tree structure of the webpage and identify the specific subtree and value for the DOM change. In operation 354, the identified portion of the DOM tree structure is captured and in operation 356 the captured DOM change is sent to the archive server.

Figure 11:
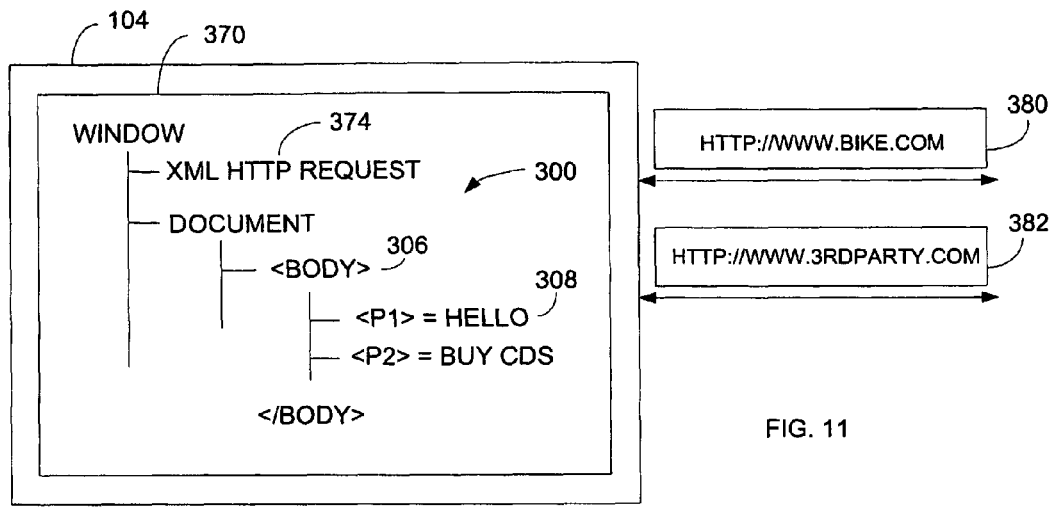
FIG. 11 depicts an example of a DOM structure configured to generate network requests.

FIG. 11 depicts an example of a webpage 370 that exchanges network events with different websites. For example, a user may initiate a request 380 to a first website. The first website may provide a response that includes webpage 370. Portions of webpage 370 may include links to third party websites. An XML HTTP command 374 may initiate a request 382 to a second website. For example, the second website may display an advertisement within webpage 370. Web browser 104 may send request 382 to the second website in response to selection of the advertisement and may receive responses back from the second website in response to request 382. The responses may comprise additional information for displaying within webpage 370 or may comprise a new home webpage for the second website.

In one example, a network session monitor server may capture network events 380 exchanged between web browser 104 and the first website. The monitor server may reduce an amount of processing required by a capture agent embedded in webpage 370 for capturing DOM events. For example, the processing required for capturing request 380 and subsequent response from the first website can be offloaded to the session monitor. One example, of a network session monitor server is described in U.S. Pat. No. 8,127,000 entitled: METHOD AND APPARATUS FOR MONITORING AND SYNCHRONIZING USER INTERFACE EVENTS WITH NETWORK DATA, issued Feb. 28, 2012, which has been incorporated by reference.

However, some monitoring servers may not be able to capture the third party network events, such as request 382 and responses to request 382. For example, some monitoring servers may be located at the first website that supplies webpage 370 and may not have authorization or the ability to monitor network traffic to and from the third party website receiving request 382.

Figure 12:
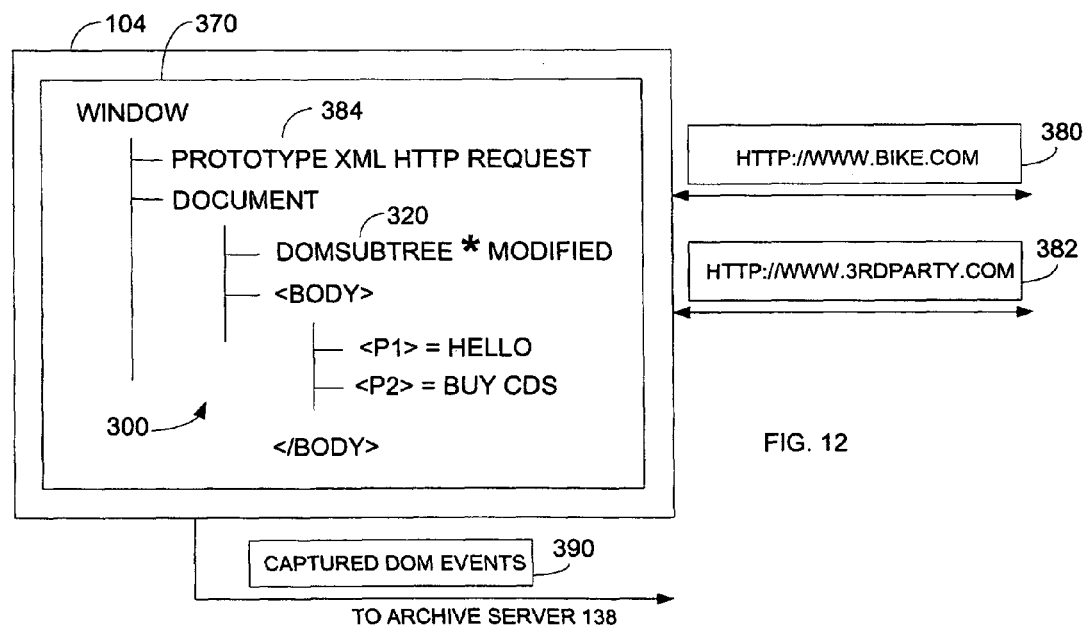
FIG. 12 depicts an example of a system for capturing DOM events for different network requests.

FIG. 12 depicts an example of how a local capture agent may more efficiently capture DOM events associated with third party websites. Network request monitoring object 384 may be configured to detect network requests 380 and 382. For example, a PROTOTYPE XML HTTP REQUEST object may identify HTTP requests to different websites. In one example, changes to webpage 370 from the responses to requests 380 and 382 may be captured by DOMSUBTREE MODIFIED object 320.

To reduce the amount of processing bandwidth needed to capture the web session, DOM events may be filtered based on the identified network events 380 and 382. For example, object 384 may identify the Universal Resource Locator (URL), protocol, and/or payload contained in network requests 380 and 382. DOM events 390 may be captured based on which requests and responses are associated with third party websites. For example, only network events 382 associated with a third party websites may be captured and sent to archive server 138. Other network events associated with the primary website associated with webpage 370 and network request 380 may be captured by a network session monitor server as described above. This reduces the amount of processing and network bandwidth agent by only capturing the network events associated with the third party websites.

In another example, DOM events may be captured for both the primary website and the third party websites. However, the capture agent may selectively choose which DOM events to capture based on request 380 and 382. For example, empirical data may indicate some DOM events associated with third party websites may not be significant when replaying the web session. Accordingly, some of the requests, responses, and other webpage content exchanged with the third party website may be filtered and not captured by the capture agent as part of captured DOM events 390.

Figure 13:
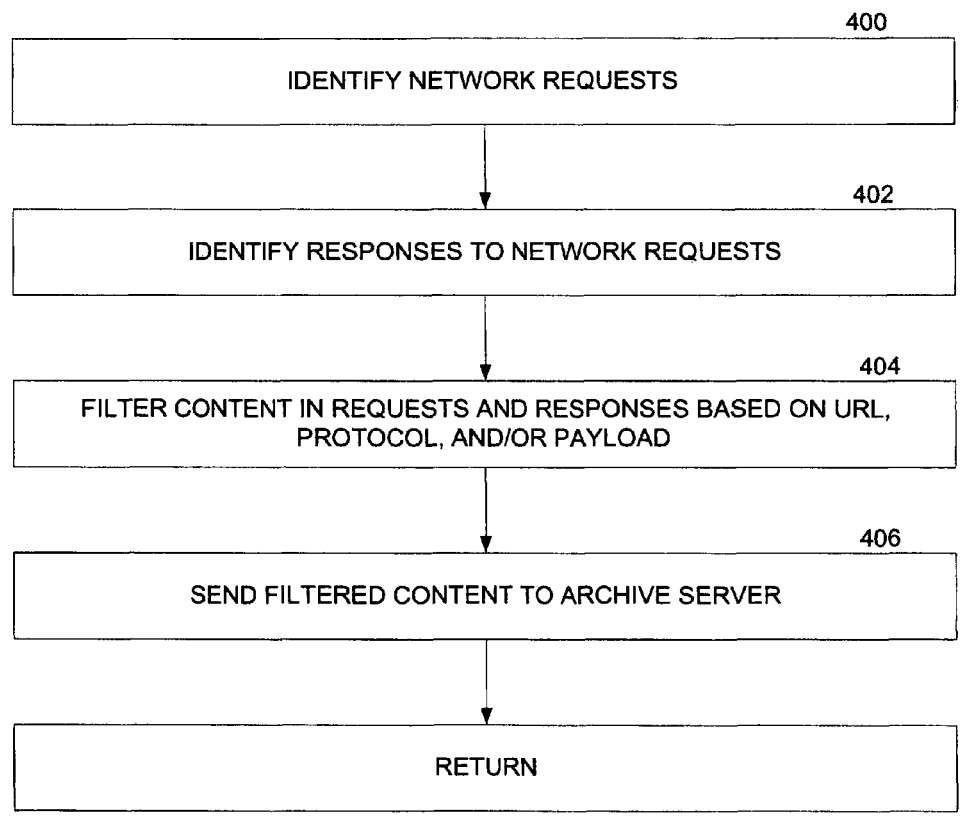
FIG. 13 depicts an example of a process for capturing DOM events based on the network requests.

FIG. 13 depicts an example of a process for capturing data based on network events. In operation 400, network requests may be detected by a capture agent. For example, an object may identify network requests sent to a primary website and detect network requests sent to third party websites. In operation 402, the object may identify responses to the network requests, such as the webpage and updates provide by the primary website and the additional webpage information and other webpages provided by the third party websites.

In operation 404, the capture agent may filter the content in the network requests and network responses. For example, the object may identify URLs, protocols, and/or payloads in the network requests and network responses. The URLs may identify the websites associated with the network requests and network responses and the protocols and payloads may identify the types of data contained in the network requests and network responses. The DOM events are captured agent based on the associated web site and the types of associated data. In operation 406, the selected network data is captured and sent to the archive server. Thus, the capture agent selectively captures not only network traffic exchanged with the primary website but also selectively captures network traffic from third party websites.

Figure 14:
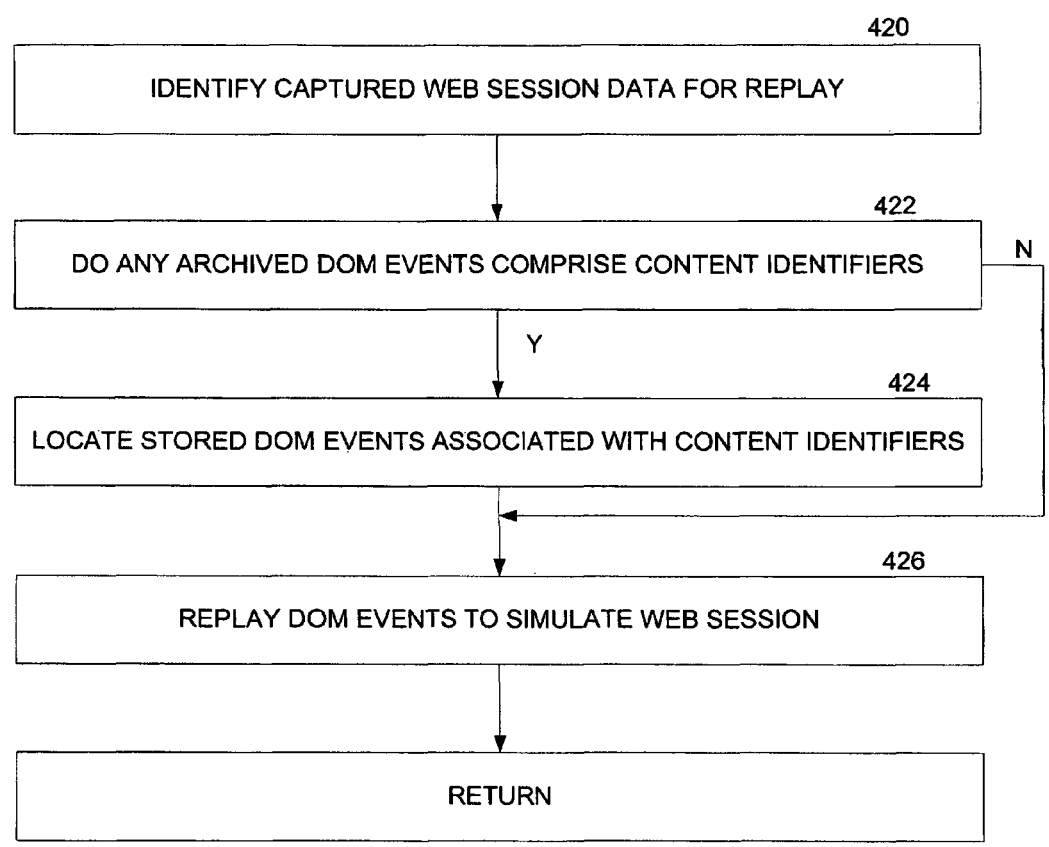
FIG. 14 depicts an example of a process for replaying captured DOM events.

FIG. 14 depicts an example of a replay operation performed by a replay engine. In operation 420, captured web session data may be identified for replaying a previous web session. For example, an operator for a website may select a file of previously captured DOM events for the original web session. In operation 422, the replay engine may identify content identifiers in the captured web session data. For example, a capture agent may have detected known DOM events during the original web session and sent content identifiers to the archive server instead of the actual DOM events.

The replay engine in operation 424 may locate the DOM events associated with the content identifiers. For example, the replay engine may reference a table that associates the content identifiers with the text, images, control data, etc. that was previously identified during the original web session.

In operation 426, the replay engine may replay the DOM events in a same manner as previously occurring during the original web session. For example, the DOM events may have associated actions, time stamps, and locations within the webpage. The replay engine may replay the DOM events according to the associated actions, in a sequence according to the associated time stamps, and at the locations in a webpage according to the associated locations.

Replay of captured web sessions is described in U.S. Pat. No. 8,042,055 entitled: REPLAYING CAPTURED NETWORK INTERACTIONS, issued Oct. 18, 2011; and U.S. Pat. No. 8,127,000 entitled: METHOD AND APPARATUS FOR MONITORING AND SYNCHRONIZING USER INTERFACE EVENTS WITH NETWORK DATA, issued Feb. 28, 2012 which are both herein incorporated by reference.

Hardware and Software

Several examples have been described above with reference to the accompanying drawings. Various other examples are also possible and practical. The systems and to methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or fininware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes, but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the tei in refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. A method, comprising:
monitoring, by a processing device, a web session;
detecting, by the processing device, a webpage displayed during the web session;
identifying, by the processing device, changes in a first set of content within the webpage, wherein the first set of content within the webpage was previously archived;
identifying, by the processing device, content identifiers associated with the first set of content within the webpage
archiving, by the processing device, the content identifiers associated with the first set of content within the webpage;
identifying, by the processing device, changes in a second set of content within the webpage, wherein the second set of content was not previously archived and not represented by associated content identifiers; and archiving, by the processing device, a copy of the second set of content within the webpage, wherein the web session is replayed by using the content identifiers as indexes for identifying and displaying the previously archived first set of content with the copy of the second set of content.

2. The method of claim 1, further comprising:
configuring an agent to monitor for the changes in the webpage; and
configuring the agent to send the content identifiers representing the the first set of content in the webpage to an archive server.

3. The method of claim 1, further comprising:
identifying actions, time stamps, and locations associated with the content identifiers; and
archiving the actions, times, and locations with the associated content identifiers.

4. The method of claim 1, further comprising:
identifying metadata for the webpage; and
determining which changes in the webpage to capture and archive based on the metadata for the webpage.

5. The method of claim 1, further comprising:
identifying network events for the web session;
identifying websites associated with the network events; and
capturing the changes in the webpage based on the websites associated with the network events.

6. The method of claim 5, wherein the websites comprise a primary website providing the webpage and third party websites providing content for the webpage.

7. An apparatus, comprising:
logic circuitry configured to:
monitor a webpage;
detect changes in content items within the webpage;
identify a first set of the content items that were previously stored and associated with identifier values;
capture the identifier values as a first part of a captured web session;
identify a second set of the content items that were not previously stored and not associated identifier values; and
copy the second set of content items as a second part of the captured web session.

8. The apparatus of claim 7, wherein the logic circuit is further configured to:
replay the web session by using the identifier values as indexes for identifying the previously stored first set of content items and displaying the previously stored first set of content items with the second set of copied content items.

9. The apparatus of claim 7 wherein the logic circuitry is further configured to use a JavaScript object to identify the identifier values for the changes in the first set of content items within the webpage.

10. The apparatus of claim 7, wherein the logic circuitry is further configured to:
identify a sequence of events for the web session; and
determine which changes in the webpage to capture based on the sequence of events for the web session.

11. The apparatus of claim 7, wherein the logic circuitry is further configured to:
identify a checkpoint event for the web session; and
copy all of the content items within the webpage in response to identifying the checkpoint event.

12. The apparatus of claim 7, wherein the logic circuitry is further configured to:
identify metadata in the webpage; and
determine which changes in the webpage to capture and archive based on the metadata in the webpage.

13. The apparatus of claim 12, wherein the logic circuitry is further configured to:
identify actions, time stamps, and locations associated with the identifier values; and
archive the actions, times, and locations with the associated identifier values.

14. The apparatus of claim 7, wherein the logic circuitry is further configured to:
monitor events for the web session;
send the events to a session analyzer;
receive a control message back from the session analyzer, wherein the control message is based on the events; and
capture changes in the webpage based on the control message.

15. A method, comprising:
archiving, by a processing device, content for a webpage in a reference table;
receiving, by the processing device, content identifier values associated with the content for the webpage displayed during a web session;
archiving, by the processing device, the content identifier values as web session data;
using, by the processing device, the content identifier values in the web session data as indexes for identifying the associated content for the webpage in the reference table; and
replaying, by the processing device, the web session by displaying from the reference table the content for the webpage identified by the content identifier values.

16. The method of claim 15, further comprising:
receiving content identifiers identifying changes in the webpage; and
archiving the content identifiers instead of the associated changes.

17. The method of claim 15, further comprising:
monitoring webpage events during the web session;
identifying changes in the webpage to capture based on the webpage events; and
sending a control message directing an agent to capture the identified changes.

18. The method of claim 15, further comprising:
receiving metadata for the webpage;
identifying changes in the webpage to capture based on the metadata; and
sending control message directing an agent to capture the identified changes.

19. The method of claim 15, further comprising:
receiving timestamps associated with changes in the webpage; and
archiving the timestamps associated with the changes for subsequent replaying of the web session.

20. The method of claim 15 further comprising:
monitoring events during the web session;
identifying a checkpoint based on the events; and
initiating capture of the entire webpage in response to identifying the checkpoint.

* * * * *